Figure 4C:
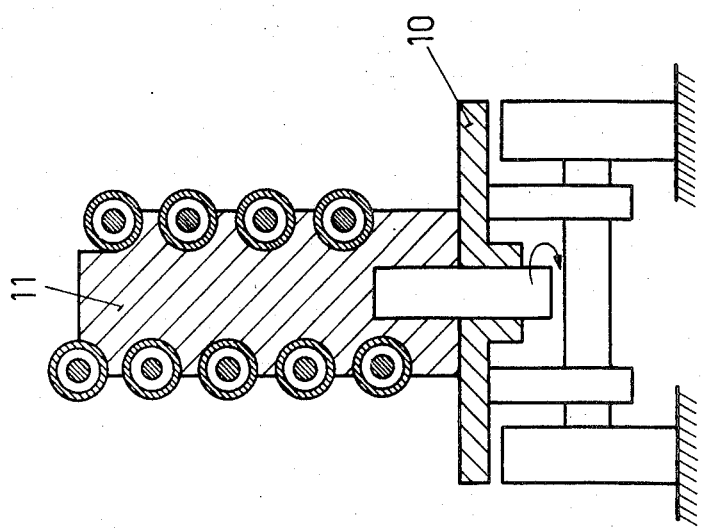

United States Patent [19]

Floessel et al.

[11] 3,823,249

[45] July 9, 1974

[54] COMPRESSED-GAS INSULATED HIGH-VOLTAGE CONDUCTOR ASSEMBLY COMPOSED OF A SERIES OF RIGID RECTILINEAR SECTIONS WITH INTERMEDIATE FLEXIBLE CONNECTING SECTIONS

[75] Inventors: Carl Dieter Floessel, Fislisbach; Klaus Floessel, Wettingen; Adolf Eidinger, Nussbaumen, all of Switzerland

[73] Assignee: BBC Brown Boveri & Company Limited, Baden, Switzerland

[22] Filed: July 16, 1973

[21] Appl. No.: 379,400

[30] Foreign Application Priority Data

Aug. 23, 1972 Switzerland...................... 12402/72

[52] U.S. Cl. .......... 174/21 C, 174/10.86, 174/99 B, 206/59 B, 285/45
[51] Int. Cl. ....................................... H02g 15/08
[58] Field of Search ........ 174/86, 68 C, 68 R, 88 C, 174/21 C, 99 B, 88 B, 10; 206/59 B; 138/119, 120, 178; 285/45, 184

[56] References Cited

UNITED STATES PATENTS

| 355,063 | 12/1886 | Crocker | 174/86 |
|---|---|---|---|
| 3,639,864 | 2/1972 | Klostermark | 174/88 C X |

FOREIGN PATENTS OR APPLICATIONS

| 155,417 | 2/1954 | Australia | 174/68 R |

*Primary Examiner*—Darrell L. Clay
*Attorney, Agent, or Firm*—Pierce, Scheffler & Parker

[57] ABSTRACT

A compressed-gas-insulated electrical high-voltage conductor assembly is comprised of a number of pressurized gas-filled rigid straight sections arranged in end-to-end relation. Each section is constituted by a length of a rigid metallic tubular member which encloses and supports centrally therein a rigid portion of the electrical conductor, and these rigid conductor-enclosing sections are joined together by means of short flexible sections of the tubular enclosing member and a corresponding flexible portion of the conductor thereby to enable the connected-together rigid sections to be bent through an angle of substantially 180° to facilitate transport from the fabrication point to a remote location for on-site installation.

4 Claims, 6 Drawing Figures

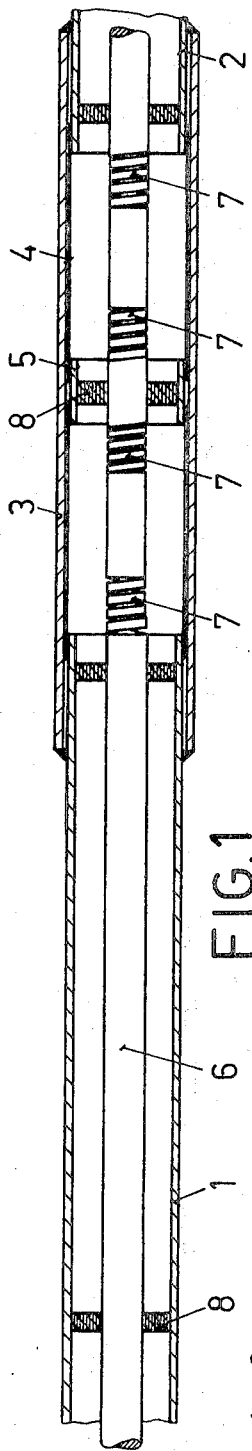
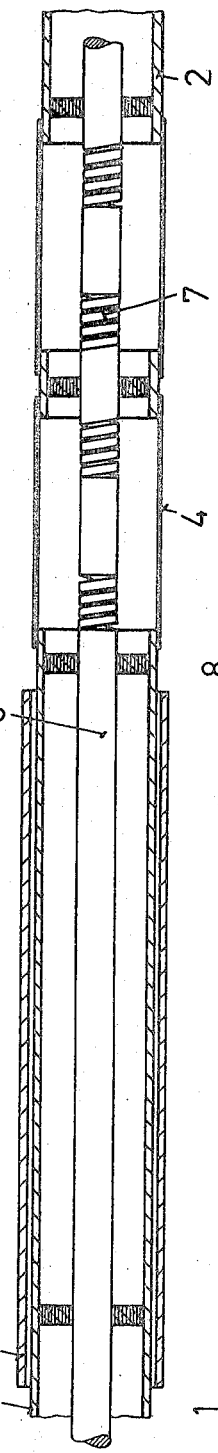
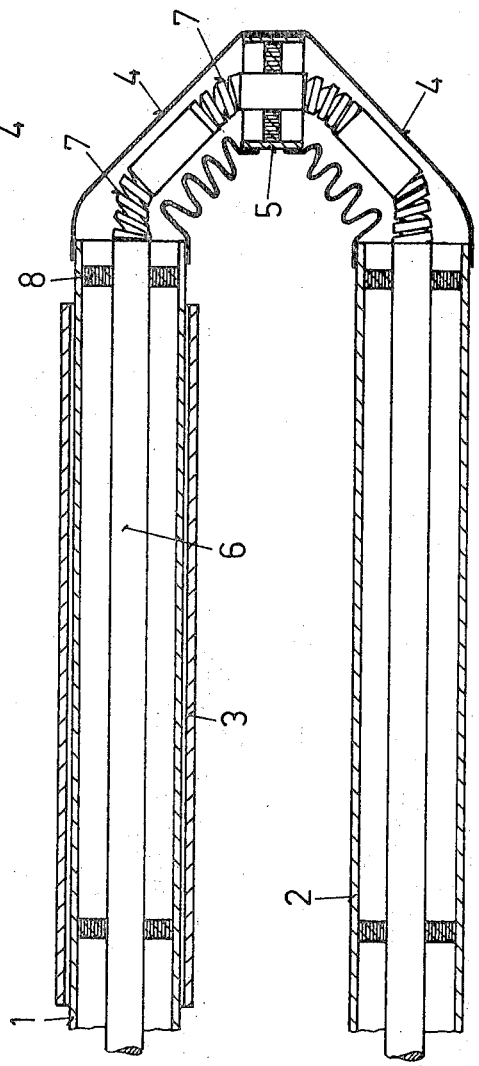

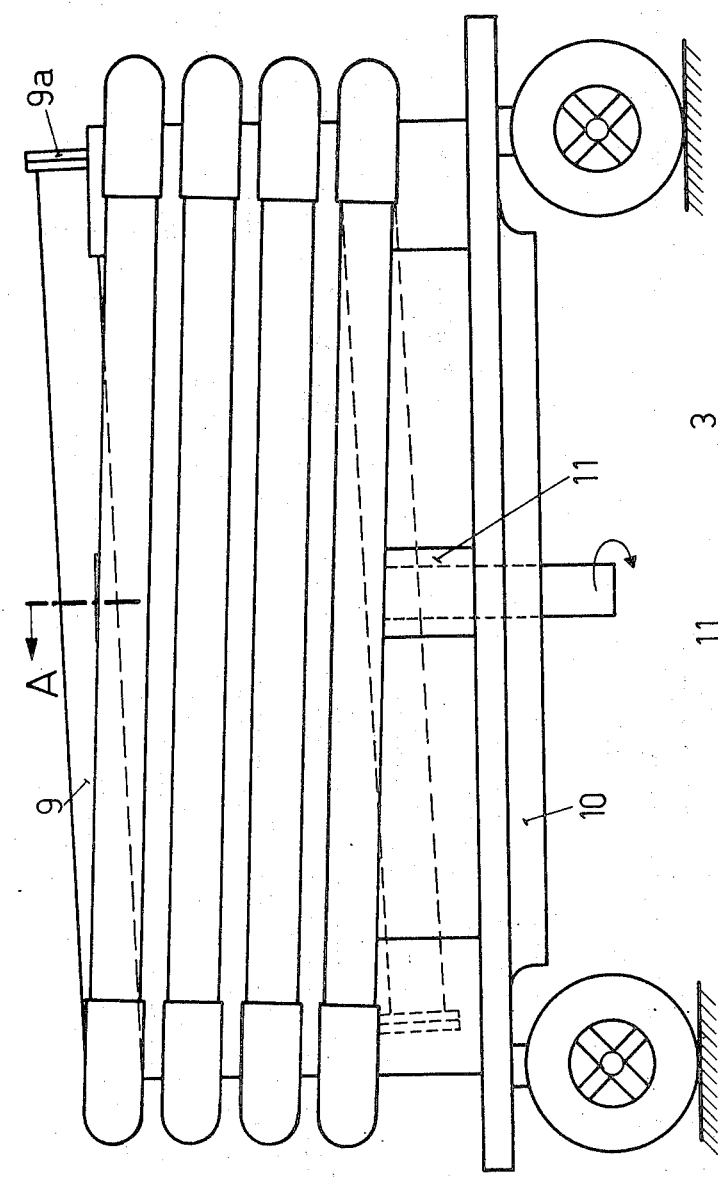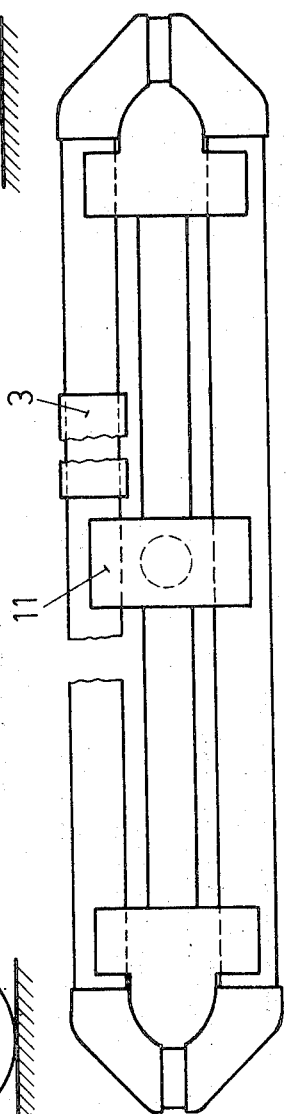
FIG. 4a
FIG. 4b

3,823,249

COMPRESSED-GAS INSULATED HIGH-VOLTAGE CONDUCTOR ASSEMBLY COMPOSED OF A SERIES OF RIGID RECTILINEAR SECTIONS WITH INTERMEDIATE FLEXIBLE CONNECTING SECTIONS

The present invention relates to an improved construction for an electrical high-voltage conductor assembly composed of straight sections such that the conductor is supported in an insulated manner within a metal enclosure and the enclosure is filled with an insulating gas, in particular $SF_6$. Such a compressed gas insulated conductor assembly is now commonly referred to in the industry as a "CGI" transmission line.

In a known form of metalclad electrical high-voltage conductor assemblies of this kind, the conductor assembly is composed of straight and rigid sections usually 10 to 12 m long. In this case the conductor is fitted beforehand in the section of the enclosure by means of suitable multileg type insulators. The sections are joined together on site, i.e. at the place of installation, by welding. A disadvantage of this method of construction, however, is that when the high-voltage conductor assembly is of great length, the operation of joining two sections has to be performed relatively frequently. This is also undesirable because there is then a greater risk of contamination within the conductor assembly.

A high-voltage conductor assembly incorporating a flexible corrugated sheath is also known. In this instance both the enclosure and the conductor are in the form of a flexible corrugated tube. Because the enclosure and the conductor remain flexible in this manner, a high-voltage conductor assembly of this kind can be wound on large drums. The maximum transportable diameter of the enclosure is, in such cases, some 250 to 300 mm, of the conductor some 100 mm, resulting in a transportable length of the high-voltage conductor assembly of approximately 200 m when using drums of some 4.5 m diameter (cf. Elektrotechnische Zeitschrift, Series A, vol. 92 (1971), No. 12, p. 735). This construction is relatively complicated and expensive and, in particular when larger diameters are required, as in the case of very high transmission voltages, is not practicable within the bounds of economically acceptable cost.

The object of this invention is to provide a solution for a high-voltage conductor assembly whereby a conductor of at least 100 m in length and composed of straight sections is used, wherein the assembly can be prefabricated and tested beforehand in the manufacturer's works, and can be transported as a whole to the place of installation at relatively little cost.

This objective is achieved in that a length of high-voltage conductor assembly composed of a number of sections and prefabricated in the manufacturer's works incorporates at each joint between two rigid rectilinear sections a flexible connecting section, in particular one allowing bending through 180°, which, following installation of the high-voltage conductor assembly on site, can be bridged by a portion of the enclosure. An example of the invention is shown in the drawings, in which:

FIG. 1 shows a part in longitudinal section of the high-voltage conductor assembly in the installed condition, FIG. 2 shows the corresponding condition during installation, FIG. 3 shows, in longitudinal section, a part of the high-voltage conductor assembly together with a bent connecting piece, and, FIGS. 4a, 4b and 4c show the pre-assembled conductor on its means of transport in side elevation, plan view and section (viewed at line A).

In FIG. 1 the two rigid straight sections 1, 2 of the enclosure are joined by a movable rigid sleeve 3, the ends of which are each welded to one of the sections. In this condition, an otherwise flexible connecting piece is located inside movable sleeve 3. The connecting piece comprises two flexible lengths of imperforate, i.e. gas-tight hose 4, of rubber, for example. The ends of the lengths of hose 4 are attached by means of a leakproof joint, e.g. by gluing, to the sections 1, 2, or to ring 5, which contains a multi-leg type insulator 8. In the region of the hose sections 4, the conductor 6 incorporates flexible, helix-shaped elements 7. The support insulators 8 hold the conductor 6 centralized in position within the enclosure 1.

In FIG. 2, in contrast to FIG. 1, the movable sleeve 3 has not yet been fitted. Here it is slid over section 1 so that, as shown in FIG. 3, in the region of the hose sections 4 the high-voltage conductor assembly can be deflected through 180°, for example.

For purposes of transport, the length 9 of pre-assembled and pre-tested high-voltage conductor assembly, composed of a number of straight sections and flexible connecting pieces, can be stacked on the means of transport 10 shown in FIGS. 4a, 4b and 4c. The transporter incorporates a rotatable drum 11, the narrow sides of which are provided with rounded recesses. When being transported, the conductor assembly, 100 m in length, for example, is filled with a gas at slight positive pressure, e.g. nitrogen. The length of conductor assembly 9 is then sealed at its ends by means of covers 9a. When being installed on site, the lengths of conductor assembly 9 are unwound, placed in position and, after removing the covers, flanged together, forming a gastight joint. The movable sleeves 3 are then welded to the straight sections 1, 2 in the position shown in FIG. 1. In certain cases, if the deviation from a straight run is not too great, the movable sleeves can be in the form either of curved sections or of flexible lengths of corrugated tube.

We claim:

1. A prefabricated electrical high-voltage conductor assembly comprising a plurality of rigid straight sections arrangeed in end-to-end relation, each of said sections being constituted by a rigid tubular member enclosing a rigid portion of a conductor supported centrally therein, flexible sections interconnecting the ends of adjacent rigid sections, each said flexible section being constituted by a flexible gas-tight tubular member connected to the end portions of said rigid tubular members and a flexible part of said conductor, said flexible sections enabling adjacently located rigid straight sections of said enclosed conductor assembly to be bent through an angle of substantially 180° for transport to an on-site installation point, and sleeve members surrounding said rigid tubular members and which are adapted to be slid into place over said flexible tubular members of said flexible sections following installation and unbending of the conductor assembly and thereafter secured to said rigid tubular members.

2. An enclosed electrical high-voltage conductor assembly as defined in claim 1 wherein the opposite ends thereof are closed by cover members and the interior thereof is filled with an insulating gas.

3. An enclosed electrical high-voltage conductor assembly as defined in claim 1 wherein each said flexible conductor part includes a plurality of helix-shaped flexible portions alternating with rigid portions.

4. An enclosed electrical high-voltage conductor assembly as defined in claim 1 wherein said flexible tubular member of each said flexible section includes an intermediate rigid ring member within which is secured an insulator member supporting the flexible conductor section centrally therein.

* * * * *